(12) United States Patent
McCreesh

(10) Patent No.: US 6,941,605 B2
(45) Date of Patent: Sep. 13, 2005

(54) MULTI-PURPOSE HAND TOOL AND SCRIBING APPARATUS UTILIZING MULTI-PURPOSE HAND TOOL

(75) Inventor: Rory McCreesh, Flushing, NY (US)

(73) Assignee: Derry Industries, LLC, Flushing, NY (US)

( * ) Notice: Subject to any disclaimer, the term of this patent is extended or adjusted under 35 U.S.C. 154(b) by 0 days.

(21) Appl. No.: 10/639,284

(22) Filed: Aug. 12, 2003

(65) Prior Publication Data

US 2005/0034244 A1 Feb. 17, 2005

(51) Int. Cl.[7] .............................. B25F 1/00; B43L 9/04
(52) U.S. Cl. .......................................... 7/164; 33/27.03
(58) Field of Search ........................ 7/164, 158; 33/19.1, 33/19.2, 32.1, 32.2, 19.3, 27.03, 425, 427, 27.031, 32.3, 27.032, 27.033, 419, 41.1

(56) References Cited

U.S. PATENT DOCUMENTS

| | | | | |
|---|---|---|---|---|
| 338,444 A | * | 3/1886 | Seargeant | 33/429 |
| 360,213 A | * | 3/1887 | Farrell | 33/43 |
| 380,360 A | * | 4/1888 | Spencer et al. | 33/43 |
| 416,719 A | * | 12/1889 | Curtis | 33/458 |
| 1,009,214 A | * | 11/1911 | Backstrom | 33/473 |
| 1,564,381 A | * | 12/1925 | Thorell | 33/419 |
| 1,577,569 A | * | 3/1926 | Donley | 33/41.1 |
| 2,557,699 A | * | 6/1951 | Silver | 33/18.1 |
| 3,153,859 A | * | 10/1964 | Jones | 33/419 |
| 4,656,744 A | * | 4/1987 | Decker | 33/41.5 |
| 5,014,436 A | * | 5/1991 | Kozyrski et al. | 33/27.03 |
| 5,050,306 A | * | 9/1991 | Renaud | 30/293 |
| 5,233,748 A | * | 8/1993 | Logan et al. | 30/310 |
| 5,309,642 A | * | 5/1994 | McGinnis | 33/32.2 |
| 5,446,969 A | * | 9/1995 | Terenzoni | 33/419 |
| 5,461,794 A | * | 10/1995 | Huang | 33/470 |
| 5,542,185 A | * | 8/1996 | Boda | 33/27.02 |
| 5,596,809 A | * | 1/1997 | Beard | 30/310 |
| 5,675,901 A | * | 10/1997 | Young | 33/451 |
| 5,784,791 A | * | 7/1998 | Nakamura | 33/27.03 |
| 6,286,216 B1 | * | 9/2001 | Braun | 30/310 |
| 6,543,144 B1 | * | 4/2003 | Morin | 33/27.032 |

FOREIGN PATENT DOCUMENTS

GB     2155406 A  * 9/1985  ............ B43L/7/00

* cited by examiner

Primary Examiner—David B. Thomas
(74) Attorney, Agent, or Firm—Adams & Wilks

(57) ABSTRACT

A multi-purpose hand tool has a first member having opposite main surfaces and an elongated slot extending through the the main surfaces. A second member is slidably and pivotally coupled to one of the main surfaces of the first member. The second member has opposite main surfaces and a through-hole which extends through the main surfaces thereof and is generally vertically aligned with the elongated slot of the first member to define with the elongated slot a passage for receiving therethrough a marking member having a marking portion for contacting the surface of the material during a marking operation. A coupling assembly slidably and pivotally couples the second member to the first member to allow the second member to slide on and pivot relative to the first member between a first position in which the multi-purpose hand tool can be used to conduct a first marking operation on the surface of the material, and a second position in which the multi-purpose hand tool can be used to conduct a second marking operation on the surface of the material different from the first marking operation.

39 Claims, 11 Drawing Sheets

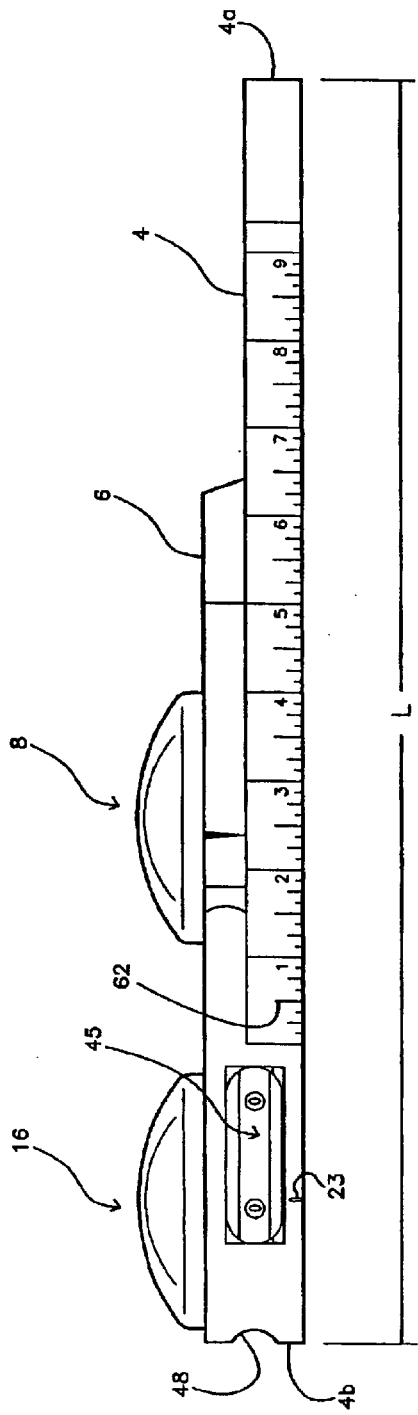
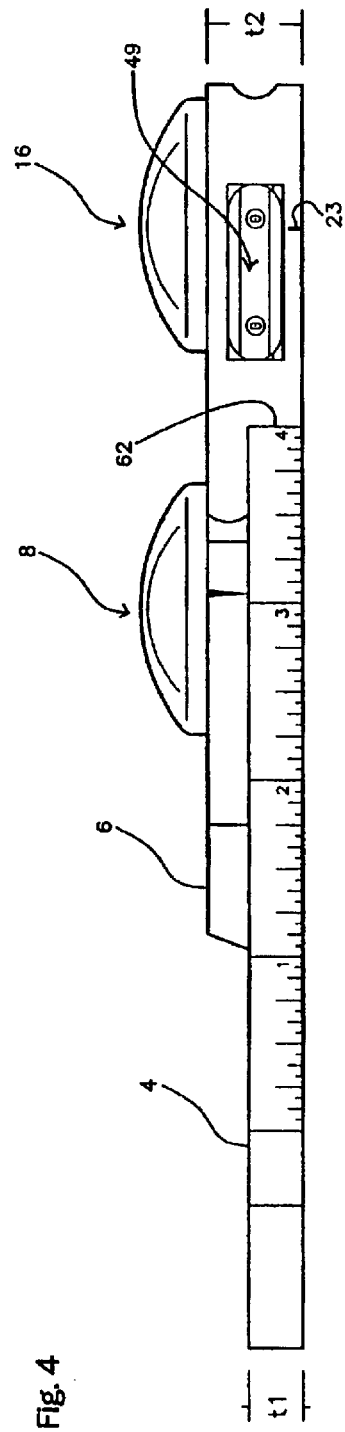
Fig. 3
Fig. 4

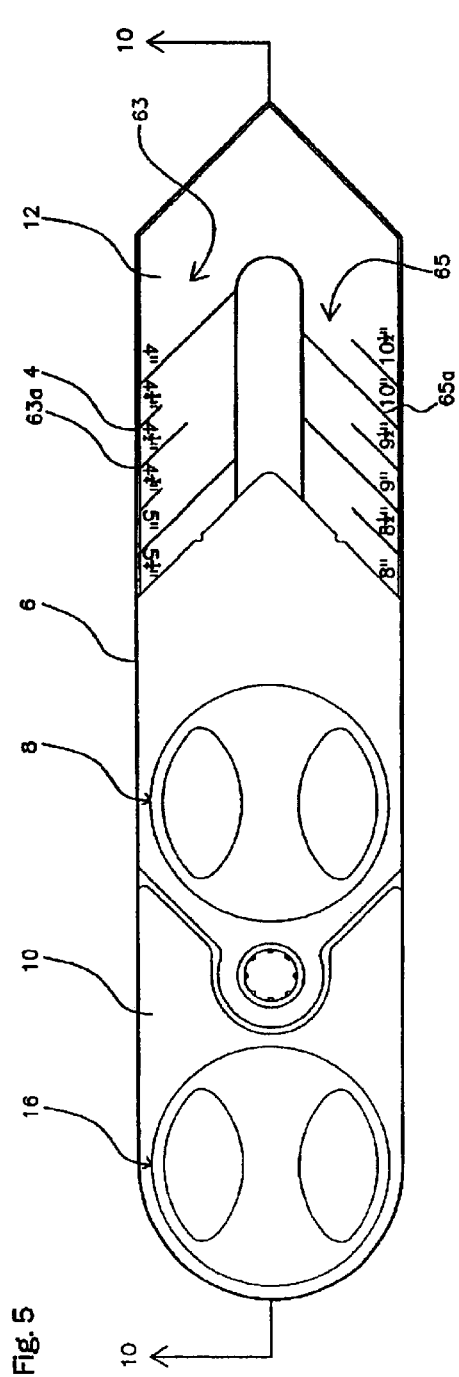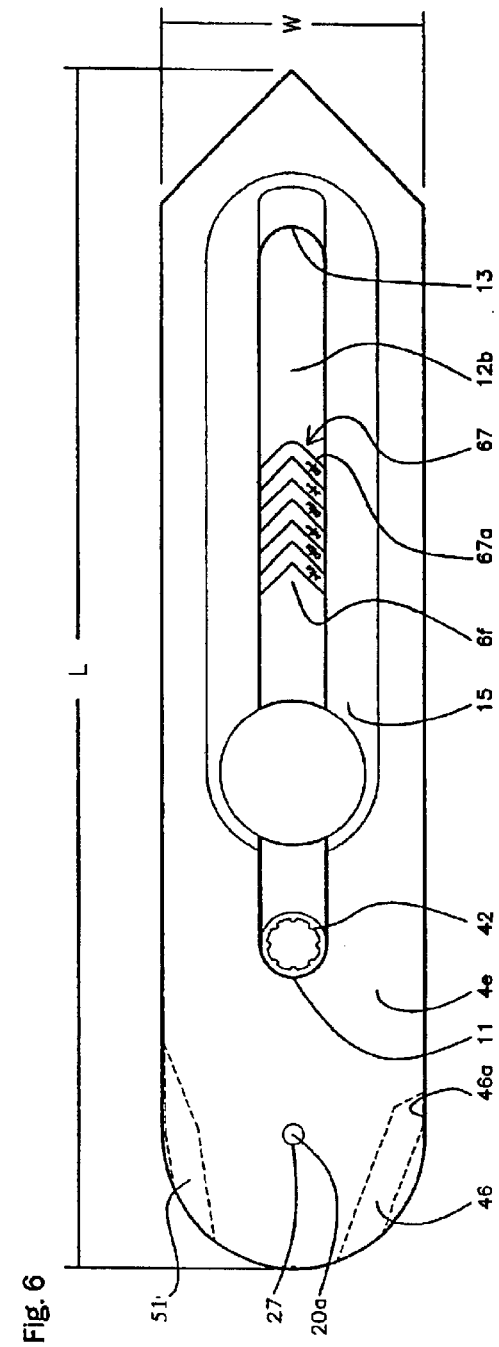
Fig. 5
Fig. 6

MULTI-PURPOSE HAND TOOL AND SCRIBING APPARATUS UTILIZING MULTI-PURPOSE HAND TOOL

BACKGROUND OF THE INVENTION

1. Field of the Invention

The present invention relates generally to hand tools and, more particularly, to a multi-purpose hand tool which is capable of being used for different tasks during commercial, industrial and residential construction, and to a scribing apparatus utilizing the multi-purpose hand tool.

2. Background Information

During the course of commercial, industrial and residential construction, various different hand tools are employed by construction workers. Generally, each hand tool is used to address one task. For example, in addition to the obvious requirement of a hammer and a saw, a carpenter/tradesman or homeowner also requires the use of a number of additional hand tools such as a combination square, a tape measure, a combination of tools to mark a piece of material which needs to be fitted against an uneven surface or to mark a door frame or a window frame for the installation of a door casing or a window casing, a compass to scribe cut lines for arcs and circles, and a utility knife or pencil sharpener to sharpen the point of pencils.

Traditionally, construction workers have maintained and transported one or more large boxes containing such single purpose hand tools to their work site, from which they draw the appropriate tool, as necessary. Having to stop and retrieve the appropriate single purpose hand tool and having to stock the various hand tools, however, is generally a great inconvenience, and costs a considerable amount of time, money and energy. Although it would be desirable, a construction worker cannot possibly keep one of each of the possible requisite hand tools in his or her work apron or pouch. Thus, because of the number of different tools which must be transported to the work site, and carried by the construction worker, a single hand tool which is capable of being used to address multiple tasks has been sought.

Several prior art devices are known which attempt to combine several hand tools into one device. However, applicant has no knowledge of any compact multi-purpose hand tool which is capable of being used to mark a piece of material which needs to be fitted against an uneven surface, mark door and window frames for the installation of door or window casings, and mark the cut line for arcs and circles, and which incorporates a pencil sharpener for sharpening pencils used in conjunction with the multi-purpose hand tool and a scale which may be utilized as a ruler to measure dimensions associated with the foregoing uses of the multi-purpose hand tool. Furthermore, the prior art devices are not sufficiently lightweight and compact to be easily stored in a construction worker's apron or pouch.

When marking a given piece of material which needs to be fitted against an uneven surface, the construction worker has the task of doing it in one single operation, thereby leaving no room for mistakes. This is typically done using a compass, set at a chosen measurement between a compass point and a pencil point. Use of the compass is not foolproof because of movement between points and the carpenter's inability to keep a steady hand and constant angle. This task can also be done using a block of wood, however, this does not provide accuracy to corners or badly out of shape walls.

When marking door and window frames for the installation of door or window casings, accuracy is of the utmost importance for appearance as well as functionality. Conventionally, a tape measure has been used to mark the window or door frame to the desired distance set back from the edge of the frame (e.g., ¼" or ¾"). However, the tape measure is not very well designed to mark such small measurements without substantial difficulty. Other conventional methods of marking door and window frames for the installation of door or window casings involves the use of a combination square and the use of two connected pieces of square blocks. However, connecting pieces of square blocks is time consuming, and field conditions may require additional blocks of wood to be made up to accommodate different set back measurements (i.e., ¼ inch set back, ⅜ inch set back, ½ inch set back, etc.) which would require fabricating and connecting additional pieces of wood for marking the new set back measurement.

A compass is typically used in conjunction with a tape measure to draw circles. However, restrictions and accuracy apply with respect to the size of circles the compass can draw. Furthermore, not only is the compass not durable when mixed with tools of more durable quality but is difficult to use when drawing a circle beyond a certain diameter (e.g., 7 inches). Thus, while the compass is a very resourceful construction tool used primarily by highly-skilled construction workers, it often cannot be found when needed because of its small size and it becomes damaged easily which makes it difficult to draw a circle with precision.

The present invention overcomes many of the disadvantages inherent in conventional multi-purpose hand tools and with the necessity of using various different hand tools during commercial, industrial and residential construction. The foregoing and other objects of the present invention will become apparent to those skilled in the art in view of the description of the best presently known mode of carrying out the invention as described herein and as illustrated in the drawings.

SUMMARY OF THE INVENTION

It is an object of the present invention to provide a multi-purpose hand tool which can be selectively used to mark a given piece of material which needs to be fitted against an uneven surface, to mark door and window frames for the installation of door or window casings, and to mark straight lines, arcs or circles with precision and without consuming a large amount of time.

Another object of the present invention is to provide a multi-purpose hand tool which incorporates a sharpener for sharpening marking pencils and a scale for taking measurements and which are used in conjunction with the multi-purpose hand tool.

Another object of the present invention is to provide a multi-purpose hand tool which is easy to operate on the job site.

Another object of the present invention is to provide a multi-purpose hand tool which may be operated quickly with little or no risk of inaccuracy due to wavering during operation.

Another object of the present invention is to provide a multi-purpose hand tool which may be readily operated without the use of auxiliary tools or excessive manipulations.

Another object of the present invention is to provide a multi-purpose hand tool which is lightweight and compact so that it can be easily carried and stored in a worker's apron or pouch.

A further object of the present invention is to provide a multi-purpose hand tool which is inexpensive, durable, dependable and fully effective in accomplishing its intended purposes.

Still a further object of the present invention is to provide a scribing apparatus utilizing the multi-purpose hand tool of the present invention for scribing a line in or on a piece of material.

The foregoing and other objects of the present invention are carried out by a multi-purpose hand tool comprising a first member having a first portion and a second portion, a second member slidably and pivotally coupled to the second portion of the first member, and a coupling assembly for pivotally coupling the second member to the second portion of the first member and allowing the second member to slide on and pivot relative to the second portion between a first position proximate a first end of the second portion in which the multi-purpose hand tool can be used to obtain a measurement for a first marking or scribing operation, and a second position proximate a second end of the second portion opposite the first end thereof in which the multi-purpose hand tool can be used to obtain a measurement for a second marking or scribing operation different from the first marking or scribing operation, to thereby provide a multi-purpose hand tool reconfigurable for a plurality of purposes.

The coupling assembly preferably comprises a boss portion extending from a surface of the second member, an elongated slot disposed between the first and second ends of the second portion of the first member for receiving the boss portion, and a releasable locking mechanism cooperating with the boss portion and the elongated slot to allow the second member to slide on and pivot relative to the second portion of the first member. The releasable locking mechanism preferably comprises a knob having a female threaded joint and a fastener having a stem provided with a male threaded joint for engagement with the female threaded joint of the knob. The first member includes a cutout region in the first portion thereof. The fastener has a head portion for sliding engagement with a surface of the cutout region during relative sliding movement between the first member and the second member.

According to another aspect of the present invention, the first member of the multi-purpose hand tool includes a retractable needle assembly. In one embodiment, the retractable needle assembly comprises a finger-engagement portion for undergoing rotation in first and second opposite directions over a first surface of the first portion, and a pin for undergoing rotation with the finger-engagement portion. The pin has a head portion, a stem extending from the head portion and having a needle point, and a male threaded joint disposed on the stem and between the head portion and the needle point.

The first portion of the first member has a through-hole extending from the first surface of the first portion to a second surface thereof opposite the first surface. The through-hole has a female threaded joint for engagement with the male threaded joint of the pin so that upon rotation of the finger-engagement portion in the first direction, the pin is displaced in a direction along a longitudinal axis thereof to protrude the needle point of the stem from an end of the through-hole at the second surface of the first portion, and so that upon rotation of the finger-engagement portion in the second direction, the pin is displaced along the longitudinal axis to retract the needle point into the through-hole.

The finger-engagement portion has a cavity for receiving the head portion of the stem so that rotation of the finger-engagement portion in each of the first and second directions rotates the pin in a respective one of the first and second directions and allows movement of the head portion of the pin within the cavity along the longitudinal axis.

In another aspect, the multi-purpose hand tool further comprises means defining at least one marking pencil rest disposed at the first end of the second member. In one embodiment, the means defining at least one marking pencil rest comprises a notch portion cut in the second member at a first end thereof.

In another aspect, the multi-purpose hand tool further comprises holding means disposed at a second end of the second member opposite the first end thereof for holding a marking pencil. In one embodiment, the holding means comprises a tubular insert disposed in the through-hole of the second member, and gripping means extending from an inner peripheral surface of the tubular insert for gripping the marking pencil. Preferably, the gripping means comprises a plurality of ribs.

According to another aspects of the present invention, the multi-purpose hand tool has measuring scales for measuring dimensions corresponding to the use of the multi-purpose hand tool. The measuring scales are preferably color-coded to facilitate selection of the measuring scale for the particular use and to facilitate identification of the dimensional markings on the measuring scales during such use.

According to yet another aspect, the multi-purpose hand tool has at least one sharpener for sharpening marking pencils.

In another aspect, the present invention is directed to a scribing apparatus comprised of a first member having a first surface for contacting a surface of a material to be scribed, a second surface disposed opposite the first surface, and a longitudinal slot extending from the first surface to the second surface. A second member is slidably and pivotally coupled to the first surface of the first member. The second member has a first main surface, a second main surface disposed opposite the first main surface, and a through-hole extending from the first main surface to the second main surface. The through-hole is generally vertically aligned with the longitudinal slot of the first member at preselected positions of the second member relative to the first member. A coupling assembly pivotally couples the second member to the first surface of the first member and allows the second member to slide on and pivot relative to the first surface of the first member. A cutting tool has a cutting member for insertion generally vertically through the through-hole of the second member and the longitudinal slot of the first member in any of the preselected positions for contacting the surface of the material to scribe a line in the surface of the material when the first member and the second member are displaced relative to the material while the first member is maintained in contact with the surface of the material.

BRIEF DESCRIPTION OF THE DRAWINGS

The foregoing summary, as well as the following detailed description of preferred embodiment of the invention, will be better understood when read in conjunction with the accompanying drawings. For the purpose of illustrating the invention, there is shown in the drawings embodiments which are presently preferred. It should be understood, however, that the invention is not limited to the precise arrangement and instrumentalities shown. In the drawings:

FIG. 3 is a right side view of the multi-purpose hand tool according to the present invention;

FIG. 4 is a left side view of the multi-purpose hand tool according to the present invention;

FIG. 5 is a top view of the multi-purpose hand tool according to the present invention;

FIG. 6 is a bottom view of the multi-purpose hand tool according to the present invention;

FIGS. 18B–18D are a bottom view, a front view, and a side view, respectively, of the cutting tool.

DETAILED DESCRIPTION OF THE PREFERRED EMBODIMENTS

Figure 1:
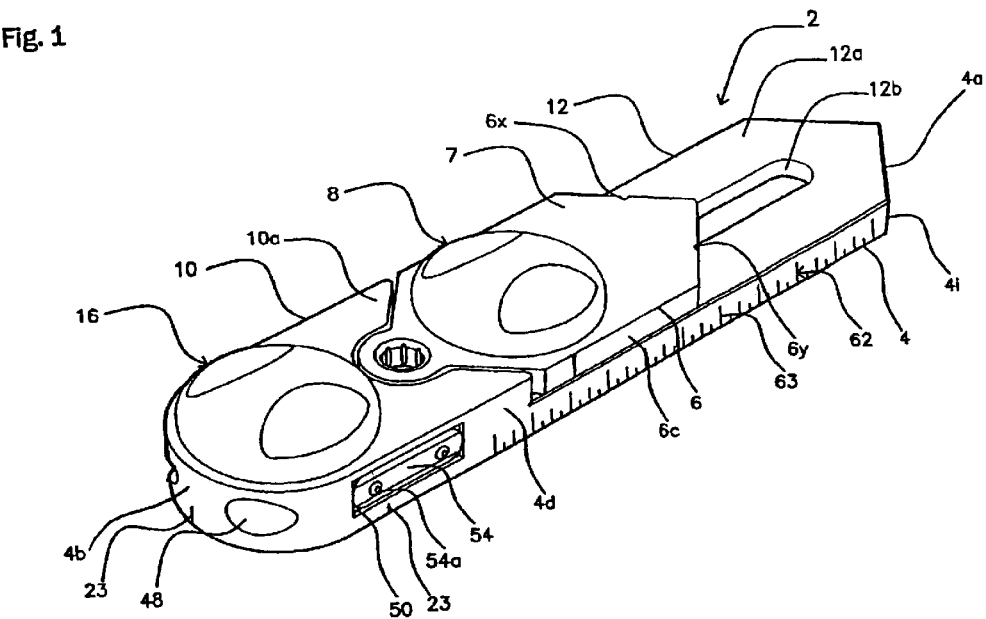
FIG. 1 is a rear perspective view of a multi-purpose hand tool according to the present invention.
Figure 2:
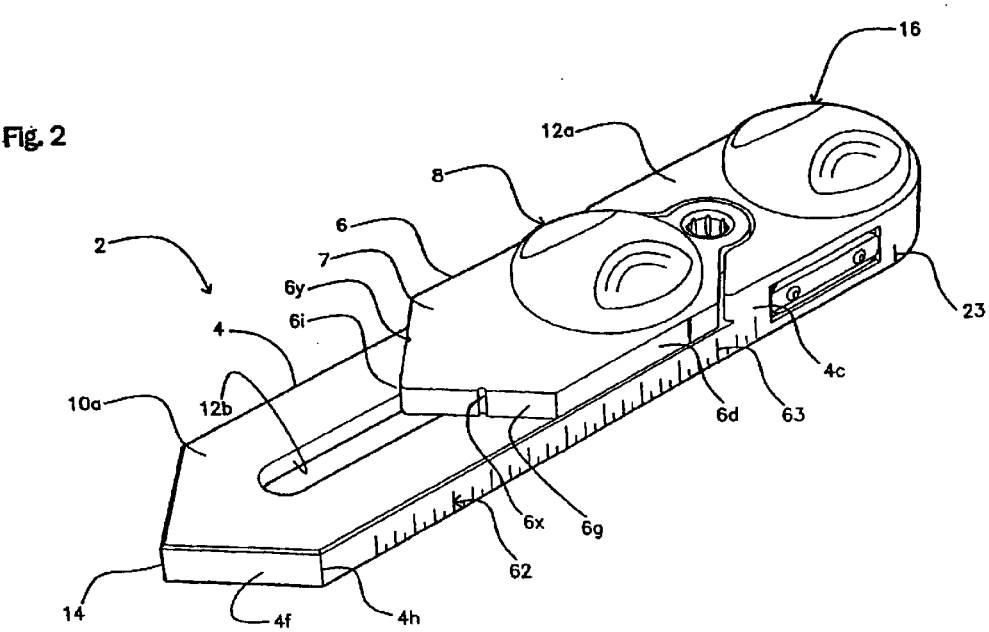
FIG. 2 is a front perspective view of the multi-purpose hand tool according to the present invention.

While this invention is susceptible of embodiments in many different forms, this specification and the accompanying drawings disclose only some forms as examples of the use of the invention. The invention is not intended to be limited to the embodiments so described, and the scope of the invention will be pointed out in the appended claims.

Certain terminology is used in the following description for convenience only and is not intended to be limiting. The words right, left, rear, front, top, bottom, inner, outer, clockwise and counterclockwise designate directions in the drawing to which reference is made. Such terminology includes the words above specifically mentioned and words of similar import.

Referring now to the drawings in detail, wherein like numerals are used to indicate like elements throughout, there is shown in FIGS. 1–17 an embodiment of a multi-purpose hand tool, generally designated at 2, according to the present invention. The multi-purpose hand tool 2 has a first member 4, a second member 6 mounted on the first member 4 for undergoing sliding and rotational movement relative thereto, and a coupling assembly comprised of a releasable locking mechanism, generally designated at 8, having a locked position and an unlocked position. As described below in detail, the releasable locking mechanism 8 allows variable orientation of the second member 6 with respect to the first member 4 in its unlocked position such that the second member 6 is permitted to rotate and linearly slide relative to the first member 4.

The first member 4 has a front portion terminating in a first end 4a, a rear portion terminating in a second end 4b, a first side 4c, a second side 4d, and a bottom surface 4e. The first member 4 has a first portion 10 which has an end terminating at the second end 4b and a second portion 12 extending from another end of the first portion 10 to the first end 4a. The first portion 10 has a top surface 10a and the second portion 12 has a top surface 12a. The bottom surface 4e of the first member 4 corresponds to a bottom surface of both the first and second portions 10, 12. As shown in FIGS. 3 and 6, the distance between the first end 4a and the second end 4b defines a length L of the first member 4 and thus the overall length of the multi-purpose hand tool 2. As shown in FIG. 4, the distance between the top surface 10a of the first portion 10 and the bottom surface 4e defines a thickness t1 of the first portion 10. The distance between the top surface 12a of the second portion 12 and the bottom surface 4e defines a thickness t2 of the second portion 12. The distance between the first side 4c and the second side 4d defines a width W of the first member 4 and thus the overall width of the multi-purpose hand tool.

The end of the first portion 10 which is opposite to the end thereof terminating at the second end 4b of the first member 4 has two tapered surfaces 10b, 10c converging toward the second end 4b and terminating in a partially circular surface 10d. The front portion of the first member 4 has two tapered surfaces 4f, 4g converging from edges 4h, 4i, respectively, toward the first end 4a to form a pointed edge 14 which, as further described below, serves as a guide edge during a marking operation of the multi-purpose hand tool 2. An elongated slot 12b is formed in the second portion 12 of the first member 4 and, as further described below, permits the second member 6 to slide and pivot relative to the first member 4. The elongated slot 12b extends partially along the length L of the multi-purpose hand tool 2 and has a first end 11 disposed proximate the circular surface 10d and a second end 13 disposed proximate a line crossing respective points along edges 4h, 4i. In the direction of the thickness t1 of the second portion 12, the elongated slot 12b extends from the top surface 12a of the second portion 12 to a surface of a cutout region 15 formed in the bottom surface 4e of the first member 4.

Figure 13:
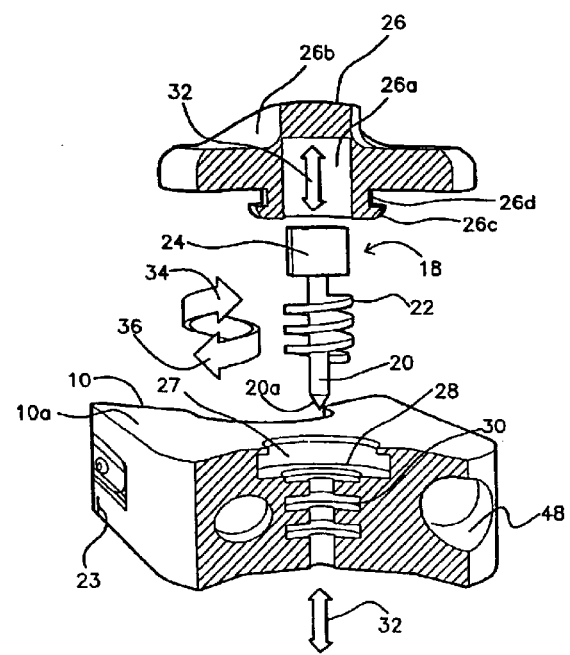
FIG. 13 is a partially exploded view of the multi-purpose hand tool showing the components of the retractable needle point mechanism according to the present invention.

The first portion 10 of the first member 4 supports a retractable needle assembly, generally designated at 16, which, as further described below, is used as a center to allow the multi-purpose hand tool 2 to rotate about an axis of a pin for circle marking. Referring to FIG. 13, the retractable needle assembly 16 comprises a pin, generally designated at 18, and a knob 26. The pin 18 has a stem 20 provided with a needle point 20a, a threaded male joint 22 disposed on the stem 20, and a head portion 24. A knob 26 has a cavity 26a for receiving the head portion 24 of the pin 18, a finger-engagement portion 26b, and an engagement portion 26c spaced from the finger-engagement portion 26b by a reduced diameter portion 26d. The first portion 10 of the first member 4 has a through-bore 27 extending from the top surface 10a to the bottom surface 4e. The through-bore 27 has a cutout 28 for receiving the engagement portion 26b of the knob 26 and a threaded female joint 30 contiguous with the cutout 28.

In the described embodiment, the engagement portion 26b of the knob 26 is a clip which is adapted to be snapped into the cut-out 28 of the through-bore 27 and which has a diameter sufficiently smaller than the cutout 28 to allow the knob 26 to rotate relative to the first portion 10. The relative dimensions of the cavity 26a of the knob 26 and the head portion 24 of the pin 18 are selected so that the knob 26 and the head portion 24 can rotate together while the head portion 24 is allowed to move along a longitudinal axis of the pin 18, denoted by the direction of arrow 32, relative to the knob 26.

Figure 10:
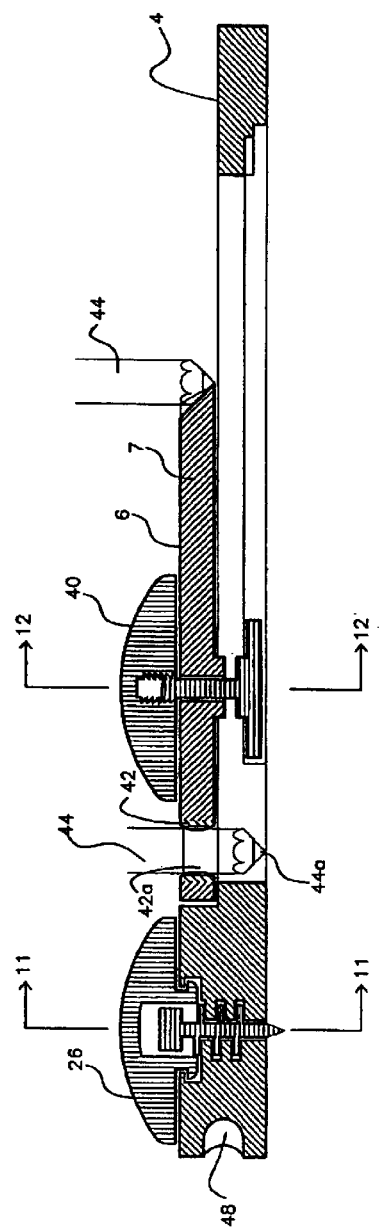
FIG. 10 is a partial cross-sectional view taken along line 10—10 in FIG. 5.
Figure 11:
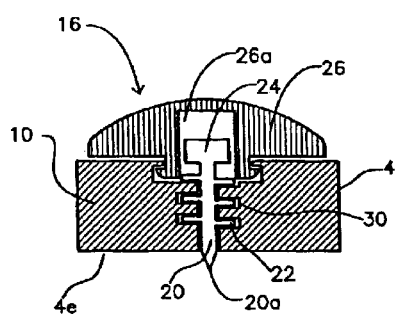
FIG. 11 is a cross-sectional view taken along line 11—11 in FIG. 10.

FIG. 11 shows the retractable needle assembly 16 in the assembled condition. The pin 18 is secured to the first portion 10 of the first member 4 by screwing the threaded male joint 22 provided on the step 20 of the pin 18 into the threaded female joint 30 provided in the first portion 10. The knob 26 can be manipulated manually (i.e., by turning in the counterclockwise directions denoted by arrows 34, 36, respectively) to displace the pin 18 in the vertical directions denoted by arrows 32 in FIG. 13 to thereby move the pin 18 from a first locking position, where the needle point 20a is retracted within the through-bore 27, as shown in FIG. 6, to a second locking position where the needle point 20a is exposed from the through-bore 27 and protrudes from the bottom surface 4e of the first member 4, as shown in FIGS. 10–11. As best shown in FIG. 11, in the assembled condition of the retractable needle assembly 16, the needle point 20a is disposed along a central axis of the first member 4 in the longitudinal direction thereof.

Referring to FIGS. 1, 2, 6, 7 and 10, the second member 6 has a generally plate-shaped body 7 having a front portion terminating in a first end 6a, a rear portion terminating in a second end 6b, a first side 6c, a second side 6d disposed generally parallel first side 6c, a top surface 6e and a bottom surface 6f. The front portion of the second member 6 has two tapered surfaces 6g, 6h converging toward the first end 6a. Each of the tapered surfaces has a notch portion 6x, 6y, respectively, which, as further described below, serves as pencil rest during a marking operation of the multi-purpose hand tool 2. The rear portion of the second member 6 has two tapered surfaces 6j, 6k converging toward the second end 6b and terminating in a partially circular protrusion 61 having a first through-hole 6m extending from the top surface 6e to the bottom surface 6f. A second through-hole 6n is disposed between the first and second ends 6a, 6b of the second member 6 and extends from the top surface 6e to the bottom surface 6f thereof. As shown in FIG. 5, the second member 6 has a width equal to the width W of the first member 4.

Figure 12:
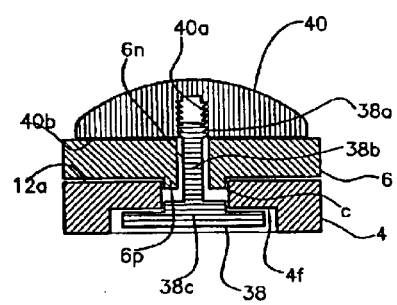
FIG. 12 is a cross-sectional view taken along line 12—12 in FIG. 10.

Referring to FIG. 12, a generally circular boss portion 6p extends from the plate-shaped body 7 at the bottom surface 6f and is contiguous with the second through-hole 6n. The boss portion 6p is dimensioned to be positioned in the elongated slot 12b of the second portion 12 with a generally circular clearance c therebetween so that the boss portion 6p is permitted to rotate in the elongated slot 12b and to be displaced linearly along the elongated slot 12b. By this construction, the boss portion 6p serves as a guide and a pivot point for the sliding and pivotal movement of the second member 6 relative to the first member 4.

Figure 7:
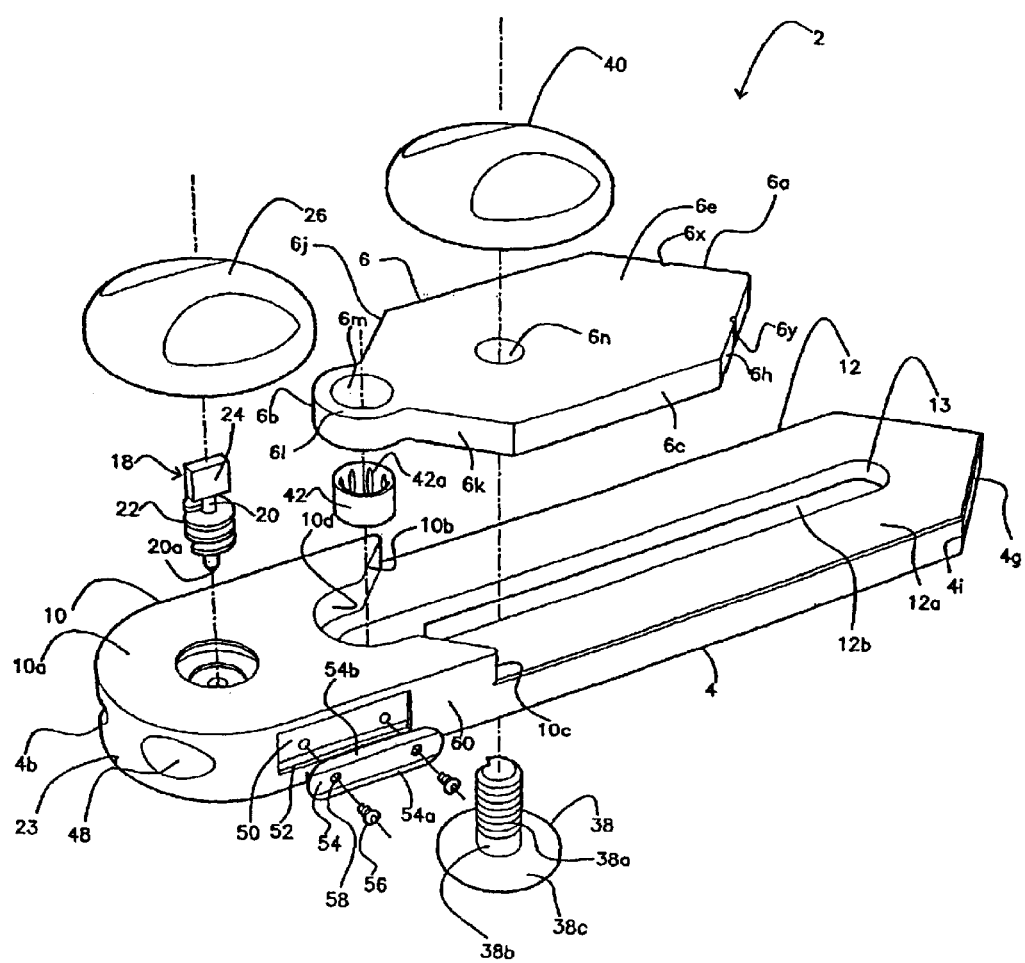
FIG. 7 is an exploded view of the multi-purpose hand tool according to the present invention.
Figure 9:
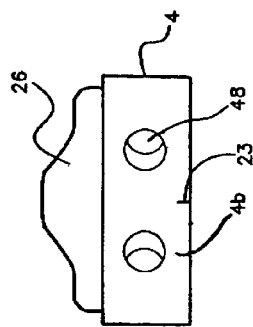
FIG. 9 is a rear view of the multi-purpose hand tool according to the present invention.
Figure 8:
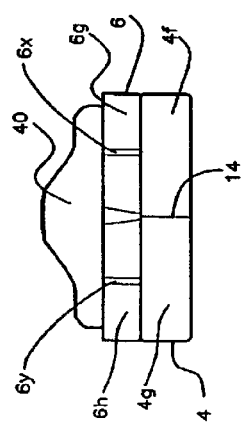
FIG. 8 is a front view of the multi-purpose hand tool according to the present invention.

The second member 6 is releasably secured to the second portion 12 of the first member 4 by the releasable locking mechanism 8. In the locked position of the releasable locking mechanism 8, the second member 6 is secured to the second portion 12 of the first member 4 to prevent any relative movement between the first and second members 4, 6. In the unlocked position of the releasable locking mechanism 8, the second member 6 is permitted to rotate and linearly slide relative to the first member 4 along the elongated slot 12b. While it is contemplated that any releasable locking mechanism known to persons skilled in the art which provides rotational and sliding movement of the second member 6 relative to the first member 4 may be used, the preferred releasable locking mechanism 8, as shown in FIGS. 7, 10 and 12, has a fastener 38 and a knob 40 having a threaded female joint 40a. The fastener 38 has a threaded male joint 38a disposed on a stem 38b and a head portion 38c.

The second member 6 is secured to the second portion 12 of the first member 4 by first positioning the bottom surface 6f of the second member 6 on the top surface 12a of the second portion 12 so that the boss portion 6p is positioned in the elongated slot 12b as shown in FIG. 12. The knob 40 is then positioned over the top surface 6e of the second member 6 so that the female threaded joint 40a is aligned with the second through-hole 6n of the second member 6, and the stem 38b of the fastener 38 is passed through the elongated slot 12b of the second portion 12 and through the through-hole 6n of the second member 6 from the bottom surface 4e of the first member 4. The threaded male joint 38a of the fastener 38 is then screwed into the female threaded joint 40a provided in the knob 40 by turning the knob 40 until the head portion 38c of the fastener 38 abuts the surface of the cutout region 15 of the first member 4 and the second member 6 is securely pressed between a bottom surface 40b of the knob 40 and the top surface 12a of the second portion 12.

The releasable locking mechanism 8 may be placed in the unlocked position by loosening the knob 40 (i.e., unscrewing the threads 40 of the knob 40 from the threads 38 of the stem 38b). In its unlocked position, the releasable locking mechanism 8 provides the second member 6 with the capability of sliding linearly along the elongated slot 12b and rotating about the guide portion 6p to be adjusted to the desired, or necessary, orientation. During sliding movement of the second member 6 relative to the first member 4, the head portion 38c is permitted to slide along the surface of the cutout region 15 of the first member 4.

Thus the knob 40 constitutes hand-tightening means for drawing the top surface 12a of the second portion 12 of the first member 4 against the bottom surface 6f of the second member 6. Such hand-tightening means greatly facilitates marking operations, allowing such marking operations to be carried out quickly and easily without additional tools. In this case, the knob 40 may be tightened and loosened quickly and easily by simple finger engagement. It will be understood by those skilled in the art that other finger-tightening devices, such as thumb screws, wing nuts and the like, could be used as well.

The second member 6 can be adjusted to a desired orientation relative to the first member 4 such that use of the multi-purpose hand tool 2 is customized for the specific use of the multi-purposed hand tool desired by the operator. For example, in one configuration shown in FIGS. 1–6 and 10, the second member 6 is positioned relative to the first member 4 so that the tapered surfaces 6j, 6k and the partially circular protrusion 61 of the second member are disposed in proximate confronting relation to the corresponding tapered surfaces 10b, 10c and partially circular surface 10d of the first portion 10. More specifically, in this configuration the second end 6b of the second member 6 abuts the first end 11 of the elongated slot 12b. After placing the releasable locking mechanism 8 in the unlocked position, the second member 6 can be slid along the elongated slot 12b in a direction away from the first portion 10 and then locked in place by the locking mechanism 8 at any desired position to achieve, for example, the configuration shown in FIG. 14.

As described in detail below, in the configurations shown in FIGS. 14 and 15 the operator can use the multi-purpose hand tool 2 to mark a cut line for a circle with a pencil 44, or score a cut line for a circle with a cutting tool 100 shown in FIGS. 18A–18D, with the diameter of the circle increasing as the second member 6 is positioned (i.e., by sliding the second member along the elongated slot 12a to a position where a circle 74, for example, can be marked) farther away from the first portion 10. From the configuration of the multi-purpose hand tool 2 shown in FIG. 14, the configuration shown in FIG. 15 is achieved by loosening the knob 40, rotating the second member 6 by 180°, sliding the second member 6 along the slot 12a to a preselected position (e.g., to mark a circle 76), and tightening the knob 40 at the preselected position.

Figure 16:
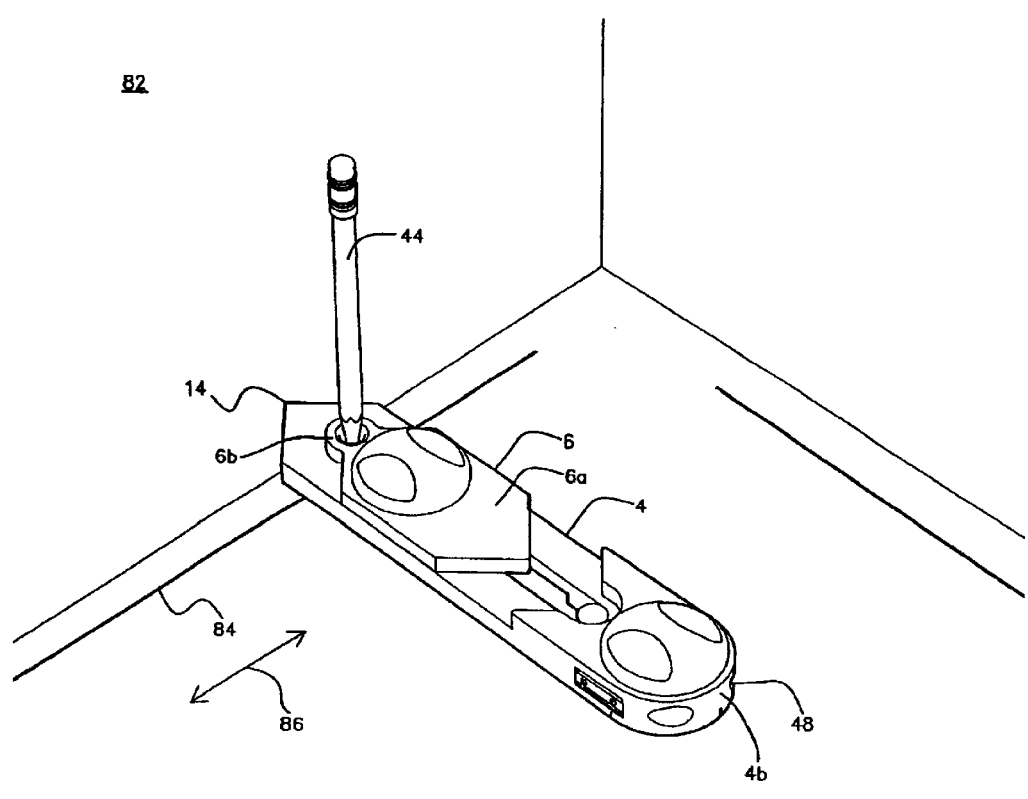
FIG. 16 is a perspective view of the multi-purpose hand tool according to the present invention during use to mark a piece of material which needs to be fitted against an uneven surface.

In another configuration shown in FIG. 16, after placing the releasable locking mechanism 8 in the unlocked position, the second member 6 is flipped or rotated 180° degrees about the guide portion 6p and then locked in place relative to the first member 4 by tightening the locking mechanism 8 at any desired position along the elongated slot 12b. As further described below, in the configuration shown in FIG. 16 the operator can use the multi-purpose hand tool 2 to, for example, mark a piece of material 80 which needs to be fitted against an uneven surface 82.

Figure 17:
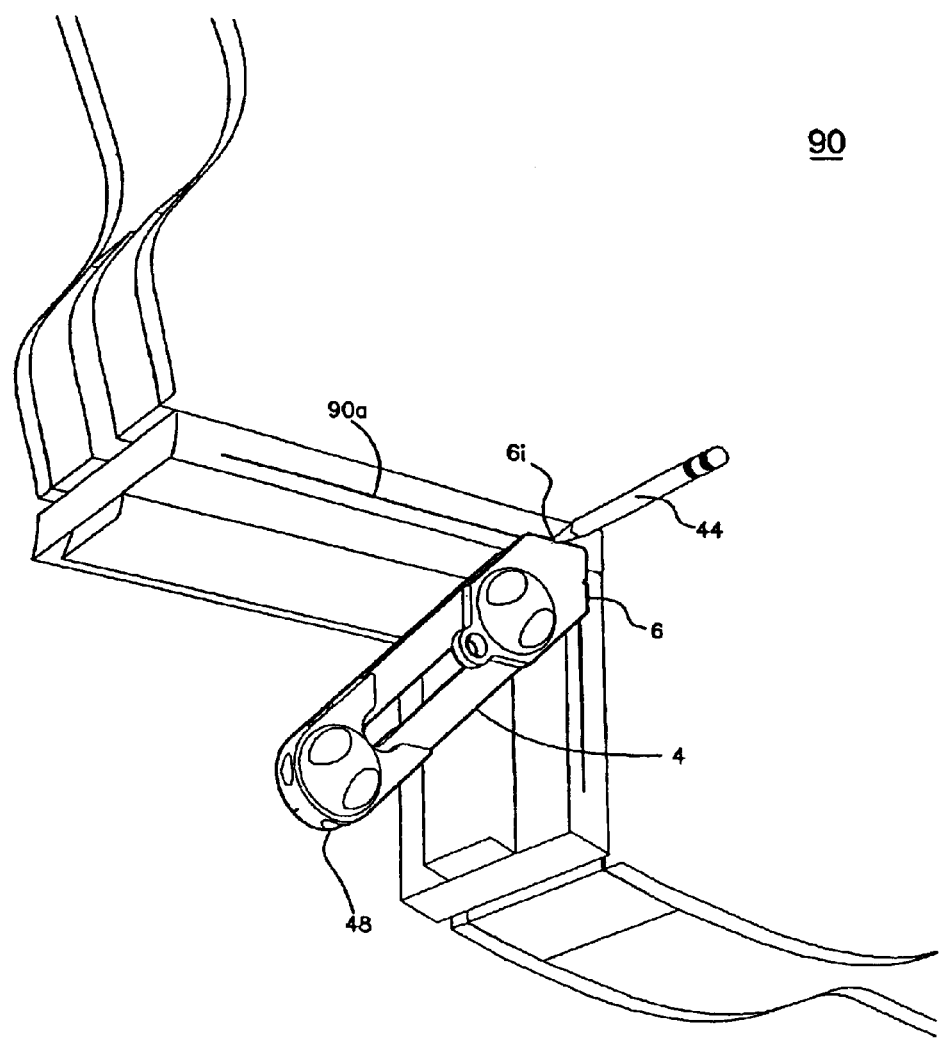
FIG. 17 is a perspective view of the multi-purpose hand tool according to the present invention during use to mark a door frame or a window frame for the installation of a door casing or a window casing, respectively.
Figure 18B:
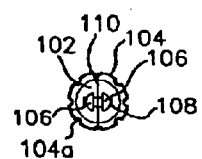
FIGS. 18A–18D show a cutting tool for use in combination with the multi-purpose hand tool according to the present invention to score a cut line for a circle with the cutting tool, where 18A is a perspective view of the combination.
Figure 18A:
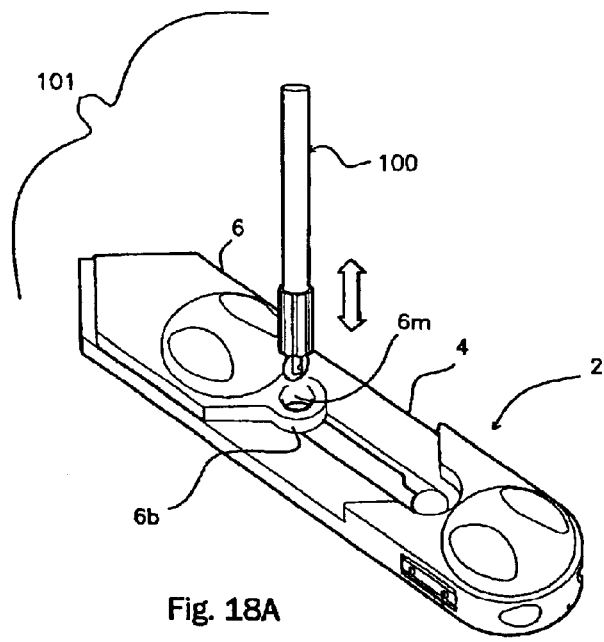
Figure 18C:
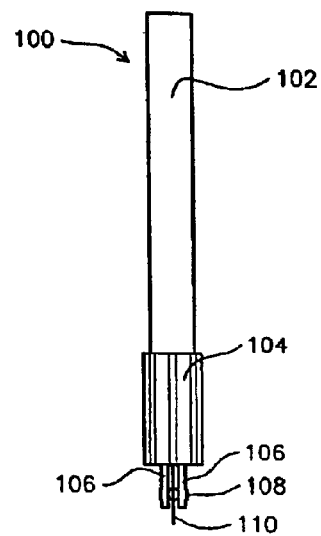
Figure 18D:
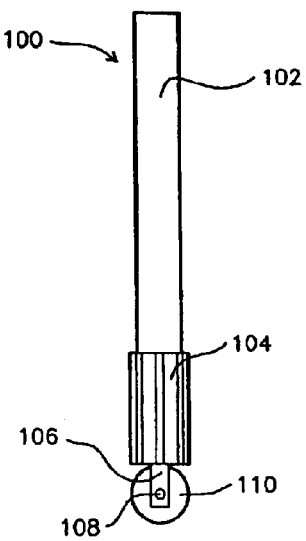

FIG. 17 shows another configuration of the multi-purpose hand tool 2 where the second member 6 is slid along the elongated slot 12b in a direction away from the first portion 10 until the first end 6a of the second member 6 extends a desired preselected amount from the first end 4a of the first member 4 and is then locked in place relative to the first member 4 by the locking mechanism 8. As further described below in the configuration shown in FIG. 17 the operator can use the multi-purpose hand tool 2 to, for example, mark a door or window frame 90 for the installation of a door or window casing.

Referring now to FIGS. 7 and 10, a generally cylindrical tubular insert 42 having a plurality of longitudinal ribs 42a extending from an inner wall surface thereof is dimensioned to be fitted in the through-hole 6m of the second member 6. The length and diameter of the tubular insert 42 is selected so that the tubular insert is retained in the through-hole 6m by friction-fit and top and bottom peripheral edges of the tubular insert lie generally flush with a respective one of the top and bottom surfaces 6e, 6f of the second member 6. The tubular insert 42 functions as a grip or holder for holding a marking pencil 44 during use of the multi-purpose hand tool 2 in the configurations shown in FIGS. 14 and 15, for example. The ribs 42a prevent any twisting of the pencil 44. In the locked position of the locking mechanism 8, the through-hole 6m, and thus the tubular insert 42, are aligned with the elongated slot 12b, as shown in FIG. 6, so that at least a tip 44a of the marking pencil 44 extends into the elongated slot and is permitted to contact a surface on which a marking operation, for example, is desired to be performed. The ribs 42a prevent any twisting of the marking pencil 44 relative to the second member 6 during use of the multi-purpose hand tool 2.

According to another aspect of the present invention, as shown in FIGS. 1, 3, 6, 7 and 10, the first portion 10 of the first member 4 includes two sharpeners, generally designated at 45 and 49, for sharpening the marking pencil 44. The sharpener 45 has a passage 46 formed in the first portion 10 and extending from the second end 4b to the second side 4d of the first member 4. An open end 48 of the passage 46 at the second end 4b allows insertion therethrough of the tip 44a of the marking pencil 44 to be sharpened. The diameter of the passage 46 is preferably selected so that the marking pencil 44 is permitted to rotate therein during a sharpening operation while being retained therein without assistance from the operator during use of the multi-purpose hand tool 2. A cutout 50 is formed in the second side 4d of the first member 4 and a longitudinal slot 52 extends through the cutout 50 to communicate the passage 46 with the exterior of the first member 4. A blade 54 is detachably mounted to the first portion 10 and extends over the slot 52 so that a cutting edge 54a of the blade 54 is aligned with the slot 52 and is oriented generally parallel to a sloping side 46a of the passage 46. Any suitable means may be used for detachably mounting the blade 54 in the cutout 50. For example, as shown in FIG. 7, the blade 54 may be mounted in the cutout 50 by passing threaded screws 56 through openings 58 of the blade 54 and screwing each of the threaded screws 56 in respective ones of threaded holes 60 formed in the cutout portion 50. Preferably, the blade 54 has another cutting edge 54b in parallel relation to the cutting edge 54a. When the cutting edge 54a is dulled, the cutting edge 54b can be used by turning the blade 54 by 180° and positioning the blade 54 in the cutout 50 so that the cutting edge 54b is aligned with the slot 52. During use, the tip of the marking pencil 44 is inserted into the passage 46 through the open end 48 and rotated against the cutting edge 54a and is thereby sharpened. The shavings of the marking pencil are directed by the cutting edge 54a to the outside of the first member 4.

The sharpener 49 has a passage 51 formed in the first portion 10 and extending from the second end 4b to the first side 4c of the first member 4. The construction of the sharpener 49 is the same as described above for the sharpener 45 except for the shape of the front end of the passages 46 and 51. As shown in FIG. 6, in the sharpener 45 the front end of the passage 46 is shaped to accommodate a pencil with a short sharpening point, as denoted by pencil 44 shown in FIG. 10. In the sharpener 49, however, the front end of the passage 51 is shaped to accommodate a pencil with a longer sharpening point (e.g., a typical sharpening point for a No. 2 pencil), as denoted by pencil 44 shown in FIGS. 14–17. It is understood by those skilled in the art that the construction of the front end of the passages 46 and 51 can be varied from the construction shown in FIG. 6 in order to accommodate pencils having sharpened points other than those denoted by the pencils 44 shown in FIGS. 10 and 14–17.

According to another aspect of the present invention, as shown in FIGS. 3–4, a measuring scale, generally designated at 62, is provided on each of the first and second sides 4c, 4d of the first member 4. The measuring scales 62 are preferably provided with dimensional markings 63 in the form of scribed thin lines to facilitate identification. The measuring scales 62 may be used as rulers, as well as scales for measuring the diameter of a circle or for measuring the distance of the line to be marked from a given surface when the multi-purpose hand tool is used by an operator, for example, in the corresponding configurations shown in FIGS. 14–17. The directions of the dimensional markings of the measuring scales 62 are reversed on the first and second sides 4c, 4d of the first member 4 to facilitate taking measurements in any of the described uses of the multi-purpose hand tool 2. Although in the present embodiment a measuring scale is provided on each of the first and second sides 4c, 4d of the first member, it is understood that the measuring scale may be provided on only one of the first and second sides 4c, 4d.

In addition to the measuring scales 62 provided on the sides of the first member 4, three additional measuring scales are preferably provided on surfaces of the first member 4 and the second member 6. Referring to FIG. 5, two measuring scales 63, 65 are provided on the top surface 12a of the second portion 12 of the first member 4 and on opposite sides of the elongated slot 12b. The measuring scales 63, 65 have dimensional markings 63a, 65a, respectively. The directions of the dimensional markings of the measuring scales 63, 65 are reversed as shown in FIG. 5 to facilitate taking measurements in any of the described uses of the multi-purpose hand tool 2. FIG. 6 shows another measuring scale 67 provided on the bottom surface 6f of the second member 6 and having dimensional markings 67a. The dimensional markings of the measuring scales 64, 65 and 67 are preferably provided in scribed thin lines to facilitate identification. The measuring scales 63, 65 and 67 may also be used as rulers, as well as scales for measuring the diameter of a circle or for measuring the distance of the line to be marked from a given surface when the multi-purpose hand tool is used by an operator, for example, in the corresponding configurations shown in FIGS. 14–17.

According to another aspect of the present invention, one or more of the measuring scales 62, 63, 65 and 67 may be color-coded to correspond to a specific function or operation, such as when the multi-purpose hand tool 2 is used by an operator in any of the corresponding configurations shown in FIGS. 14–17. The dimensional markings of the measuring scales 62, 63, 65 and 67 may also be color-coded for easier identification purpose. During use of the multi-purpose hand tool 2 having the color-coded measuring scales, the user can readily select the measuring scale to be used for a particular operation by mere inspection of the color designated as corresponding to the operation.

Various practical uses for the multi-purpose hand tool 2 of the present invention will now be illustrated in conjunction with FIGS. 1–17.

Figure 14:
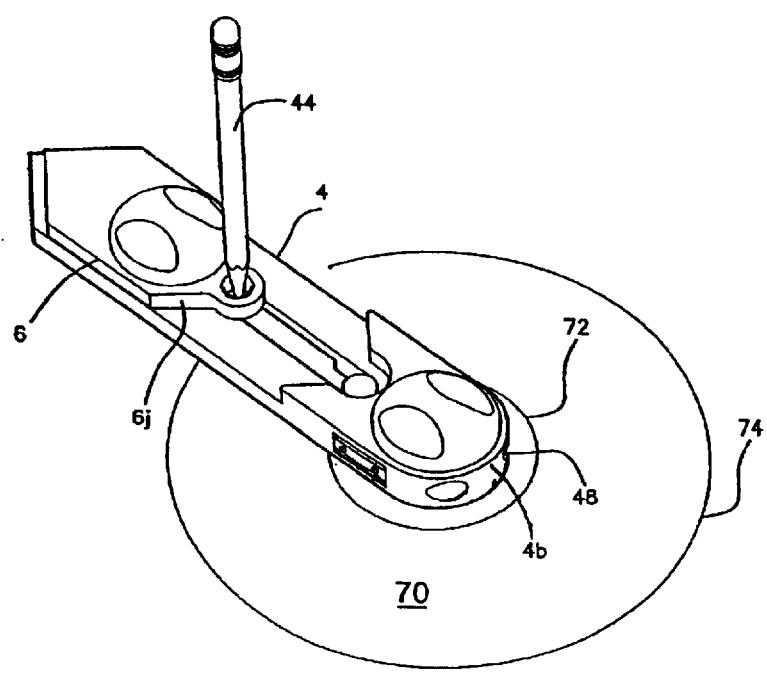
FIG. 14 is a perspective view of the multi-purpose hand tool according to the present invention disposed in a first configuration during use to mark a cut line for a circle.
Figure 15:
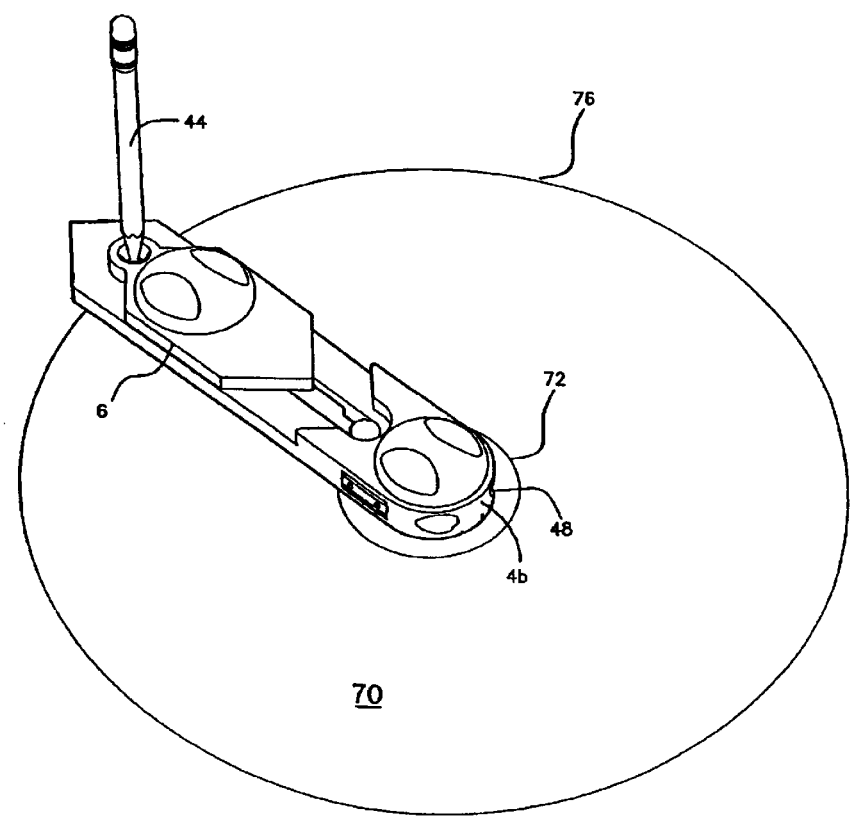
FIG. 15 is a perspective view of the multi-purpose hand tool according to the present invention disposed in a second configuration during use to mark a cut line for a circle.

FIG. 14 illustrates the multi-purpose hand tool 2 of the present invention used to mark a cut line for a circle. After locating the center of the circle to be marked on a piece of material 70, the multi-purpose hand tool 2 is disposed on the piece of material 70 so that the needle point 20a of the pin 18 of the retractable needle assembly 16 coincides with the marked center of the circle. The user then turns the knob 26 clockwise (i.e., in the direction denoted by arrow 36 in FIG. 13) to thereby move the pin 18 to the second locking position where the needle point 20a protrudes from the bottom surface 4e of the first member 4 and contacts the material 70 at the marked center of the circle. In this state, the multi-purpose hand tool 2 is sufficiently held or anchored on the material 70 by the needle point 20a so that the multi-purpose hand tool does not slide relative thereto and the needle point 20a can be used as a center about which the multi-purpose hand tool is rotated to draw a circle on the material 70 as described below.

In order to facilitate positioning of the needle point 20a at the center of the circle to be marked, center indicators in the form of markings 23 are provided on the second end 4b, the first side 4c, and the second side 4d of the first member 4, as shown in FIGS. 1–4, 7, 9 and 13. The marking 23 on the second end 4b of the first member 4 coincides with the central axis of the first member 4 in the longitudinal direction thereof and, therefore, also coincides with the needle point 20a which lies on the central axis as described above. The needle point 20a also lies on a line extending through the markings 23 on the first and second sides 4c, 4d of the first member 4. After selecting the center of the circle to be marked on the material 70, accurate positioning of the needle point 20a at the center of the circle is accomplished by first drawing perpendicular lines through the selected center of the circle and then positioning the multi-purpose hand tool 2 on the material 70 so that the marking 23 on the second end 4b of the first member 4 coincides with one of the perpendicular lines and the markings 23 on the first and second sides 4c, 4d of the first member 4 coincide with the other perpendicular line. The needle point 20a is then anchored to the material 70 at the selected center of the circle as described above.

After locating the center of the circle to be marked utilizing the markings 23 and positioning the needle point 20a of the pin 18 at the center of the circle as described above, the diameter of the circle is selected by the user by sliding the second member 6 along the elongated slot 12b of the first member 4. It will be appreciated by those of ordinary skill in the art that the combination of the length of the elongated slot 12b and the fixed distance between the needle point 20a of the pin 18 and the first end 11 of the elongated slot 12b defines the range of diameters of the circle which can be drawn by the multi-purpose hand tool 2 in the configuration shown in FIG. 14. Thus, the minimum diameter of the circle that can be drawn using the multi-purpose hand tool 2 in the configuration shown in FIG. 14 is achieved by positioning the second member 6 relative to the first member 4 so that the second end 6b of the second member 6 is disposed at the first end 11 of the elongated slot 12b. After locking the releasable locking mechanism 8 at this position of the sliding member 6, the marking pencil 44 is inserted into the tubular insert 42 until the tip 44a contacts the surface of the material 70. A circle 72 is then drawn on the material 70 by rotating the multi-purpose hand tool 2 about the center defined by the needle point 20a. In this embodiment, the diameter of the circle 72 is equal to twice the distance (i.e., radius) between the needle point 20a of the pin 18 and the center of the first through-hole 6m of the second member 6.

To position the multi-purpose hand tool 2 for marking another circle, the knob 26 of the retractable needle assembly 16 is first rotated counterclockwise (i.e., in the direction denoted by arrow 34 in FIG. 13) to thereby move the pin 18 to the first locking position where the needle point 20a is retracted within the through-bore 27. Then, after marking the desired center of the new circle to be drawn on the piece of material 70, the needle point 20a of the pin 18 is moved to the second locking position so that the needle point 20a coincides with the marked center of the circle and can be used as a center for the circle to be drawn as described above.

Thereafter, in order to draw a circle 74 on the material 70 having a larger diameter than the circle 72, the releasable locking mechanism 8 is first placed in the unlocked position, as described above, and the second member 6 is slid along the elongated slot 12b in a direction toward the second end 13 until a desired diameter is selected for the circle to be drawn. When the desired diameter is selected, the releasable locking mechanism 8 is placed in the locked position as described above to prevent relative sliding movement between the first member 4 and the second member 6. After locking the releasable locking mechanism 8, the marking pencil 44 is inserted into the tubular insert 42 until the point 44a contacts the surface of the material 70. The circle 74 is then drawn on the material 70 by rotating the multi-purpose hand tool 2 about the center defined by the needle point 20a. The maximum diameter of the circle that can be drawn using the multi-purpose hand tool 2 in the configuration shown in FIG. 14 is achieved by sliding the second member 6 relative to the, first member 4 so that the second end 6b of the second member 6 is disposed at the second end 13 of the elongated slot 12b.

FIG. 15 shows an alternative configuration of the multi-purpose hand tool 2 for marking a cut line for a circle having a diameter greater than the maximum diameter of the circle achieved by the configuration of the multi-purpose hand tool 2 shown in FIG. 14. The configuration shown in FIG. 15 for marking a cut line for a circle is achieved as follows. After placing the releasable locking mechanism 8 in the unlocked position as described above, the second member 6 is rotated 180° relative to the first member 4 from the configuration shown in FIGS. 1–6 and 10 so that the first end 6a of the second member 6 confronts the first portion 10 of the first member 4 and the second end 6b of the second member 6 confronts the pointed edge 14 of the first member 4. After locating the center of the circle to be marked utilizing the markings 23 and positioning the needle point 20a of the pin 18 at the center of the circle as described above, the diameter of the circle is selected by the user by sliding the second member 6 along the elongated slot 12b of the first member 4. At this point, the releasable locking mechanism 8 is placed in the locked position as described above to prevent relative sliding movement between the first member 4 and the second member 6. After locking the releasable locking mechanism 8, the marking pencil 44 is inserted into the tubular insert 42 until the tip 44a contacts the surface of the material 70. A circle 76, for example, is then drawn on the material 70 by rotating the multi-purpose hand tool 2 about the center defined by the needle point 20a.

By the foregoing construction and method of use of the multi-purpose hand tool 2 according to the present invention, the carpenter/tradesman or homeowner can draw circles more quickly and in a highly efficient manner as compared to conventional methods for drawing circles.

FIG. 16 illustrates the multi-purpose hand tool 2 of the present invention used to mark a piece of material 80 which needs to be fitted against an uneven surface 82. The multi-purpose hand tool 2 is disposed on a surface of the piece of material 80 with the pointed edge 14 of the first member 4 confronting the uneven surface 82. After placing the releasable locking mechanism 8 in the unlocked position as described above, the second member 6 is rotated 180° relative to the first member 4 from the configuration shown in FIGS. 1–6 and 10 so that the first end 6a of the second member 6 confronts the first portion 10 of the first member 4 and the second end 6b of the second member 6 confronts the pointed edge 14 of the first member 4. Thereafter, the multi-purpose hand tool 2 is moved toward the uneven surface 82 until the pointed edge 14 of the first member 4 is brought into contact with the uneven surface 82. After a desired distance from the uneven surface 82 where a line 84 is to be marked on the piece of material 80 is selected, the second member 6 is slid along the elongated slot 12b until the center of the through-hole 6m lies at a point on the piece of material 80 corresponding to the selected distance from the uneven surface 82. At this point, the releasable locking mechanism 8 is placed in the locked position as described above to prevent relative sliding movement between the first member 4 and the second member 6. After locking the releasable locking mechanism 8, the marking pencil 44 is inserted into the tubular insert 42 until the point 44a of the marking pencil 44 contacts the surface of the piece of material 80. The line 84 is then marked on the piece of material 80 by sliding the multi-purpose hand tool 2 along the piece of material 80 in either of the directions denoted by the double-headed arrow 86 while the point 44a of the marking pencil 44 is maintained in contact with the piece of material 80 and the pointed edge 14 of the first member 4 is maintained in contact with the uneven surface 82.

The configuration of the multi-purpose hand tool 2 and its application as described above and shown in FIG. 16 is typically adapted for tradesmen and homeowners with little or no experience in carpentry or general construction. An alternative configuration of the multi-purpose hand tool 2 for the application shown in FIG. 16 is adapted for the professional tradesman who, through experience, are capable of maintaining a steady hand during the marking operation. In the alternative configuration, if the desired distance from the uneven surface 82 where a line 84 is to be marked on the piece of material 80 is known, the user uses only the measuring scales 62 to mark the line 84 on the piece of material 80 by sliding the multi-purpose hand tool 2 along the piece of material 80 in either of the directions denoted by the double-headed arrow 86 while the point 44a of the marking pencil 44 is maintained in contact with the piece of material 80 and the pointed edge 14 of the first member 4 is maintained in contact with the uneven surface 82.

By the foregoing construction and method of use, the multi-purpose hand tool 2 according to the present invention can aid the carpenter/tradesman or homeowner to accurately mark and cut (i.e., scribe) any given piece of wood, corian, formica, sheet rock, etc., which needs to be fitted against any horizontal or vertical uneven surface (e.g., the installation of a wood countertop against an uneven vertical wall).

FIG. 17 illustrates the multi-purpose hand tool 2 of the present invention used to mark a door or window frame 90 for the installation of a door or window casing. From the configuration shown in FIGS. 1–6 and 10, the releasable locking mechanism 8 is first placed in the unlocked position as described above. The second member 6 is then slid along the elongated slot 12b to a full frontal position until the second end 6b of the second member 6 is disposed at the second end 13 of the elongated slot 12b. The second member 6 is then slid to a preselected setting by positioning the second member 6 so that the first end 6a of the second member 6 extends beyond the pointed edge 14 of the first member 4 by an amount corresponding to the preselected setting. The preselected setting is typically in the range of $\frac{1}{16}^{th}$ of an inch to $\frac{3}{4}^{th}$ of an inch (e.g., a typical installation being $\frac{1}{4}^{th}$ of an inch or $\frac{3}{8}^{th}$ of an inch) set back from the edge 90a of the frame 90. Once the preselected setting is set, the releasable locking mechanism 8 is placed in the locked position as described above. Thereafter, the pointed edge 14 of the first member 4 is placed against an inside intersecting corner of the frame 90 so that the tapered surfaces 4f, 4g of the first member 4 abut horizontal and vertical edges of the frame 90. The marker pencil 44 is then placed first in the notch portion 6x and then in the notch portion 6y of the second member 6 and the multi-purpose hand tool 2 is slid horizontally and vertically, respectively, while the tapered surfaces 4f, 4g of the first member 4 abut horizontal and vertical edges of the frame 90 so that the outer edge of the 90° angle is marked all around the frame 90. Thus the multi-purpose hand tool 2 according to the present invention will allow the carpenter/tradesman or homeowner to accurately pinpoint the exact location of the intersection of the inner edges of the 45° cuts, while also marking the selected set back position for the door or window casing.

The configuration of the multi-purpose hand tool 2 and its application as described above and shown in FIG. 17 is typically adapted for professional tradesmen who, through experience, are capable of maintaining a steady hand as the multi-purpose hand tool 2 is slid while the marker pencil 44 is rested in the notch portions 6x, 6y of the second member 6 during the marking operation. An alternative configuration of the multi-purpose hand tool 2 for the application shown in FIG. 17 is adapted for the novice tradesmen and homeowners with little or no experience in carpentry or general construction. In the alternative configuration, the second member 6 is positioned relative to the first member 4 as described above for the application shown in FIG. 16. More specifically, after placing the releasable locking mechanism 8 in the unlocked position as described above, the second member 6 is rotated 180° relative to the first member 4 from the configuration shown in FIGS. 1–6 and 10 so that the first end 6a of the second member 6 confronts the first portion 10 of the first member 4 and the second end 6b of the second member 6 confronts the pointed edge 14 of the first member 4. Thereafter, the second member 6 is slid to a preselected setting by positioning the second member 6 so that the second end 6b, including the first through-hole 6m, extends beyond the pointed edge 14 of the first member 4 by an amount corresponding to the preselected setting. Once the preselected setting is set, the releasable locking mechanism 8 is placed in the locked position as described above. Thereafter, the pointed edge 14 of the first member 4 is placed against an inside intersecting corner of the frame 90 so that the tapered surfaces 4f, 4g of the first member 4 abut horizontal and vertical edges of the frame 90. The marker pencil 44 is then placed in the tubular insert 42 until the point 44a of the marking pencil 44 contacts the surface of the frame 90 and the multi-purpose hand tool 2 is slid horizontally and vertically while the tapered surfaces 4f, 4g of the first member 4 abut horizontal and vertical edges of the frame 90 so that the outer edge of the 90° angle is marked all around the frame 90.

In the foregoing uses for the multi-purpose hand tool 2 of the present invention described with reference to FIGS. 14–17, all measurements are taken utilizing one or more of the measuring scales 62, 63, 65 and 67 which, as described above, may be color-coded to facilitate selection of the measuring scale for the particular use and to facilitate identification of the dimensional markings on the measuring scales during such use.

It is contemplated that the length L and width W of the first member 4 may be any size desired or necessary to achieve the objectives of the user of the multi-purpose hand tool 2. However, a key feature of the present invention are various structural dimensions of various components and portions which allows the present invention to be extremely useful as a multi-purpose hand tool for carpenters/tradesmen and homeowners while achieving a compact structure and without compromising the objectives of the user. In this regard, a length L of the first member 4 is preferably in the range of 6.44 to 7.86 inches, and more preferably 7.125 inches. The width W of the first member 4 is preferably in the range of 1.42 to 1.74 inches, and more preferably 1.56 inches. The thickness t1 of the first portion 10 and the thickness t2 of the second portion 12 are preferably in the range of 0.49 to 0.69 inches, and more preferably 0.56 inches. The foregoing preferred length L of the first member 4 permits the elongated slot 12b to have a length (i.e., the distance between the first and second ends 11, 13 of the elongated slot 12b) preferably in the range of 4.1 to 4.9 inches, and more preferably 4.5 inches. The foregoing preferred length L of the first member 4 also allows the distance between the needle point 20a of the pin 18 and the first end 11 of the elongated slot 12a to be preferably in the range of 0.84 to 1.0 inches, and more preferably 0.94 inches. Both the foregoing preferred length of the elongated slot 12b and the foregoing preferred distance between the needle point 20a of the pin 18 and the first end 11 of the elongated slot 12a permit the users to draw circles ranging from approximately 2.25 inches to 10.5 inches. As described above, the range of diameters for the circles which can be drawn by the multi-purpose hand tool 2 according to the present invention is defined by the combination of the length of the elongated slot 12a and the fixed length defined between the needle point 20a of the pin 18 and the first end 11 of the elongated slot 12a.

The multi-purpose hand tool 2 according to the present invention as generally described and illustrated in the figures herein could be constructed using any number of acceptable methods using a wide variety of different materials. The materials for the components of the multi-purpose hand tool 2 according to the present invention are selected to preferably provide sufficient protection from the environmental elements, to provide sufficient rigidity to make the multi-purpose hand tool rugged to resist damage on the job site, and to enable the multi-purpose hand tool to be carried and stored in a worker's apron or pouch. Thus the components of the multi-purpose hand tool 2 are preferably of sturdy rigid construction and the materials are preferably selected to be lightweight and resistant to chemicals, ultraviolet rays, hot and cold temperatures and impact.

For example, the first and second members 4, 6 are preferably manufactured by an injection moulded process using high performance plastics such as a nylon blend (e.g., CAPRON™), a polycarbonate/polyester blend (e.g., XENOY™), or a polycarbonate/Acrylonitrile-Butadiene-Styrene blend (e.g., CYCOLAY™). The releasable locking mechanism 8 (e.g., fastener 38 and knob 40) and the retractable needle assembly 16 (e.g., pin 18 and knob 26) are preferably manufactured by an injection moulded process using high performance plastics such as a nylon blend (e.g., CAPRON™), a polycarbonate/polyester blend (e.g., XENOY™), or an acetal copolymer (e.g., CELCON™). The tubular insert 42 for gripping or holding the marking pencil 44 is preferably manufactured by an injection moulded process using thermoplastic polyurethane (e.g., ELASTOLAN™). However, it will be understood by those of ordinary skill in the art that other high performance plastics and a wide variety of other materials, including lower grade plastics such as polypropelene and durable and rigid materials such as aluminum and steel, would be acceptable for the first and second members 4, 6, the releasable locking mechanism 8, the retractable needle assembly 16, and the tubular insert 42. The blade 54 and the screws 56 are preferably made of stainless steel or other suitable metal. Despite the sturdy rigid construction of the knob 26 of the retractable needle assembly 16, the reduced diameter portion 26d between the finger-engagement portion 26b and the engagement portion 26c allows the engagement portion 26c to flex sufficiently such that the engagement portion 26c can be snapped into the cutout 28 of the through-bore 27, as shown in FIGS. 10 and 11, during assembly of the multi-purpose hand tool 2.

FIGS. 18A–18D show a scribing apparatus 101 according to the present invention for scoring a cut line in a piece of material. The scribing apparatus 101 comprises a multi-purpose hand tool 2 according to any one of the foregoing described embodiments and a cutting tool 100 for use in combination with the multi-purpose hand tool 2. The cutting tool 100 has an elongated member 102, a sleeve 104 mounted on one end of the elongated member 102, and a pair of leg portions 106 extending from the end of the elongated member 102 and disposed in space-apart relation from each other. A pin 108 extends transversely to and connects the leg portions 106 to one another. A generally circular-shaped blade 110 is mounted on the pin 108 for undergoing rotation relative thereto. The sleeve 104 is provided with a plurality of longitudinal ribs 104a extending along an outer wall surface thereof. The longitudinal ribs 104a of the sleeve 104 function as a grip or holder for holding the cutting tool 100 in the tubular insert 42 fitted in the through-hole 6m of the second member 6 and prevent any twisting of the cutting tool 100 during use of the multi-purpose hand tool 2. The diameter of the sleeve 104 is therefore selected so that the sleeve 104 is retained in the tubular insert 42 while the longitudinal ribs 104a prevent any twisting of the cutting tool 100 relative to the second member 6 during use of the multi-purpose hand tool 2. The diameter of the blade 110 is also selected so that it is permitted to be passed through the tubular insert 42 until it contacts the surface on which a scoring operation is desired to be performed.

The cutting tool 100 can be used in combination with the multi-purpose hand tool 2 of the present invention to score a a cut line for any of the uses for the multi-purpose hand tool 2 of the present invention described above with reference to FIGS. 14–17, except for the configuration of the multi-purpose hand tool shown in FIG. 17 in which the pencil point rests on the notch portions 6x, 6y of the second member 6 to mark the line around the frame 90. For example, during use of the multi-purpose hand tool 2 to score a line in a piece of material 80 which needs to be fitted against an uneven surface 82, as shown in FIG. 16, the cutting tool 100 is inserted into the tubular insert 42 until the cutting blade 110 contacts the surface of the piece of material 80. The line 84 is then scored in the piece of material 80 by sliding the multi-purpose hand tool 2 along the piece of material 80 in either of the directions denoted by the double-headed arrow 86 while the blade 110 of the cutting tool 100 is maintained in contact with the piece of material 80 and the pointed edge 14 of the first member 4 is maintained in contact with the uneven surface 82.

The multi-purpose hand tool 2 can also be used in combination with the cutting tool 100 to score a line for a circle, as shown in FIGS. 14 and 15. For example, after locating the center of the circle to be marked utilizing the markings 23 and positioning the needle point 20a of the pin 18 at the center of the circle as described above, the diameter of the circle is selected by the user by sliding the second member 6 along the elongated slot 12b of the first member 4. After locking the releasable locking mechanism 8 at this position of the sliding member 6, the cutting tool 100 is inserted into the tubular insert 42 until the cutting blade 110 contacts the surface of the material 70. A circle (e.g., any one of circles 72, 74 and 76 shown in FIGS. 14–15) is then scored in the material 70 by rotating the multi-purpose hand tool 2 about the center defined by the needle point 20a.

The unique construction of the present invention results in a highly versatile multi-purpose hand tool and scribing apparatus each having a unique design which permits the carpenter/tradesman or homeowner to selectively use the multi-purpose hand tool and scribing apparatus to mark or scribe a given piece of material which needs to be fitted against an uneven surface, to mark and scribe door and window frames for the installation of door or window casings, and to mark and scribe straight lines, arcs or circles with precision and without consuming a large amount of time. The multi-purpose hand tool and the scribing apparatus of the present invention are lightweight and compact so that they can be easily carried and stored in a worker's apron or pouch and is easy to operate on the job site. Furthermore, the inventive multi-purpose hand tool and scribing apparatus may be operated quickly by both highly-skilled and novice carpenters/tradesmen and homeowners with little or no risk of inaccuracy because of wavering during operation and may be readily operated without the use of auxiliary tools or excessive manipulations. The multi-purpose hand tool and the scribing apparatus according to the present invention will enable the not so skilled tradesman or homeowner to achieve professional results.

Moreover, the multi-purpose hand tool and the scribing apparatus according to the present invention may be manufactured in any size and weight and is highly durable and resistant to structural or performance degradation.

From the foregoing description, it can be seen that the present invention comprises an improved multi-purpose hand tool and an improved scribing apparatus. It will be appreciated by those skilled in the art that obvious changes can be made to the embodiments described in the foregoing description without departing from the broad inventive concept thereof. It is understood, therefore, that this invention is not limited to the particular embodiments disclosed, but is intended to cover all obvious modifications thereof which are within the scope and the spirit of the invention as defined by the appended claims.

I claim:

1. A multi-purpose hand tool comprising: a first member having a first portion, a second portion, the second portion having a first main surface, a second main surface opposite the first main surface for contacting a surface of a material to be marked during a marking operation, and an elongated slot extending through the first and second main surfaces of the second portion; a second member slidably and pivotally coupled to the second portion of the first member, the second member having first and second opposite main surfaces and a through-hole extending through the first and second main surfaces of the second member and being generally vertically aligned with the elongated slot of the first member to define with the elongated slot a passage for receiving therethrough a marking member having a marking portion for contacting the surface of the material during a marking operation; and a coupling assembly for slidably and pivotally coupling the second member to the second portion of the first member to allow the second member to slide on and pivot relative to the second portion between a first position in which the multi-purpose hand tool can be used to conduct a first marking operation on the surface of the material, and a second position in which the multi-purpose hand tool can be used to conduct a second marking operation on the surface of the material different from the first marking operation, thereby providing a multi-purpose hand tool reconfigurable for a plurality of purposes.

2. A multi-purpose hand tool according to claim 1; wherein the coupling assembly includes means for slidably and pivotally coupling the second member to the second portion of the first member to allow the second member to slide on the second portion while coupled to the second portion.

3. A multi-purpose hand tool according to claim 1; wherein the coupling means comprises a boss portion extending from a surface of the second member, the elongated slot of the first member for receiving the boss portion, and a releasable locking mechanism cooperating with the boss portion and the elongated slot to allow the second member to slide on and pivot relative to the second portion of the first member.

4. A multi-purpose hand tool according to claim 3; wherein the releasable locking mechanism comprises a knob having a female threaded joint and a fastener having a stem provided with a male threaded joint for engagement with the female threaded joint of the knob.

5. A multi-purpose hand, tool according to claim 4; wherein the first member includes a cutout region in the first portion thereof; and wherein the fastener has a head portion for sliding engagement with a surface of the cutout region during relative sliding movement between the first member and the second member.

6. A multi-purpose hand tool according to claim 1; wherein the first portion of the first member includes a retractable needle assembly comprised of a finger-engagement portion for undergoing rotation in first and second opposite directions over a first surface of the first portion and a pin for undergoing rotation with the finger-engagement portion, the pin having a head portion, a stem extending from the head portion and having a needle point for penetrating the surface of the material during a marking operation, and a male threaded joint disposed on the stem and between the head portion and the needle point.

7. A multi-purpose hand tool according to claim 6; wherein the first portion of the first member has a through-hole extending from the first surface of the first portion to a second surface thereof opposite the first surface, the through-hole having a female threaded joint for engagement with the male threaded joint of the pin so that upon rotation of the finger-engagement portion in the first direction, the pin is displaced in a direction along a longitudinal axis thereof to protrude the needle point of the stem from an end of the through-hole at the second surface of the first portion for penetrating the surface of the material during a marking operation, and so that upon rotation of the finger-engagement portion in the second direction, the pin is displaced along the longitudinal axis to retract the needle point into the through-hole.

8. A multi-purpose hand tool according to claim 7; wherein the finger-engagement portion has a cavity for receiving the head portion of the stem so that rotation of the finger-engagement portion in each the first and second directions rotates the pin in the respective first and second direction and allows movement of the head portion of the pin within the cavity along the longitudinal axis.

9. A multi-purpose hand tool according to claim 1; wherein the second member has a first end portion, a second end portion having the through-hole, and means defining at least one marking member rest disposed at the first end portion for providing a resting surface on which a marking member is rested for marking the surface of the material during a marking operation.

10. A multi-purpose hand tool according to claim 9; wherein the means defining a marking member rest comprises a notch portion cut in the second member at the first end portion thereof.

11. A multi-purpose hand tool according to claim 1; further comprising holding means for holding the marking member in the through-hole of the second member during a marking operation.

12. A multi-purpose hand tool according to claim 11; wherein the holding means comprises a tubular insert disposed in the through-hole of the second member, and gripping means extending from an inner peripheral surface of the tubular insert for gripping the marking member.

13. A multi-purpose hand tool according to claim 12; wherein the gripping means comprises a plurality of ribs.

14. In combination: a multi-purpose hand tool according to claim 12; and a marking member having a body terminating at one end thereof in a short marking point for marking the material during a marking operation of the multi-purpose hand tool, the gripping means of the multi-purpose hand tool including means for directly gripping the body of the marking member at a position in the vicinity of the short marking point.

15. A combination according to claim 14; wherein the multi-purpose hand tool comprises a sharpener having a passage formed in the first portion of the first member for receiving at least the short marking point of the marking member, and a blade detachably mounted on an outer surface of the first portion of the first member and disposed in communication with the passage for sharpening the short marking point of the marking member.

16. A multi-purpose hand tool according to claim 1; wherein each of the first member and the second member includes at least one measuring scale.

17. A multi-purpose hand tool according to claim 16; wherein the measuring scales are color-coded.

18. A multi-purpose hand tool according to claim 1; wherein the second member is slidably and pivotally coupled to the second portion of the first member so that the second main surface of the second member directly contacts the first main surface of the second portion of the first member.

19. A multi-purpose hand tool according to claim 1; wherein the second member comprises a generally planar-shaped member having a generally uniform thickness.

20. A multi-purpose hand tool according to claim 1; wherein the first member has a length in the range of 6.44 to 7.86 inches and a width in the range of 1.42 to 1.74 inches; and wherein the elongated slot of the first member has a length in the range of 4.1 to 4.9 inches.

21. A multi-purpose hand tool according to claim 1; wherein the first and second marking operations comprise operations for marking arc or circles of different radii or diameters on the surface of the material.

22. A multi-purpose hand tool according to claim 1; wherein the first marking operation comprises an operation for marking an arc or a circle on the surface of the material; and wherein the second marking operation comprises an operation for marking a straight line on the surface of the material.

23. A multi-purpose hand tool according to claim 1; wherein each of the first and second members is injection moulded from a single piece of plastic material.

24. A multi-purpose hand tool comprising: a first member having a first portion, a second portion, the second portion having a first main surface, a second main surface opposite the first main surface for contacting a surface of a material to be marked during a marking operation, and an elongated slot formed in the second portion and extending through the first and second main surfaces of the second portion; a second member slidably and rotatably coupled to the second portion of the first member, the second member having a first main surface, a second main surface disposed opposite the first main surface, and a through-hole extending from the first main surface to the second main surface, the through-hole being generally vertically aligned with the longitudinal slot of the first member at preselected positions of the second member relative to the first member for receiving therethrough a marking member so that during a marking operation, the multi-purpose hand tool can be used to mark a line on the surface of the material when the marking member is inserted generally vertically through the through-hole of the second member and the longitudinal slot of the first member in any of the preselected positions and is maintained in contact with the surface of the material while the first member and the second member are displaced relative to the material; a releasable locking mechanism mounted on the second member and having a locked position for securing the second member to the second portion of the first member in any of the preselected positions to prevent relative movement therebetween during a marking operation, and an unlocked position for permitting the second member to rotate and linearly slide relative to the first member along the elongated slot to any of the preselected positions; and a retractable needle assembly mounted on the first member and having a pin provided with a needle point for penetrating the material during a marking operation to provide a center allowing the multi-purpose hand tool to rotate about an axis of the pin for marking an arc or a circle on the surface of the material while the marking member is inserted generally vertically through the through-hole of the second member and the longitudinal slot of the first member in any of the preselected positions and is maintained in contact with the surface of the material.

25. A multi-purpose hand tool according to claim 24; wherein the second member has a first end portion, a second end portion having the through-hole, and means defining at least one marking member rest disposed at the first end portion for providing a resting surface on which a marking member is rested for marking a line on the surface of the material during a marking operation.

26. A multi-purpose hand tool according to claim 25; wherein the means defining a marking member rest comprises at least one notch portion cut in the second member at the first end portion thereof.

27. A multi-purpose hand tool according to claim 26; wherein the first end portion of the second member comprises a pair of converging tapered surfaces each for selectively contacting the material to be marked during a marking operation; and wherein the at least one notch portion comprises a pair of notch portions cut in respective tapered surfaces of the second member.

28. A multi-purpose hand tool according to claim 25; wherein the marking operation with the marking member rested on resting surface of the second member comprises an operation for marking a door or window frame for the installation of a door or window casing.

29. A multi-purpose hand tool according to claim 25; wherein the marking operation comprises an operation for marking a line on a piece of the material which needs to be fitted against an uneven surface.

30. A multi-purpose hand tool comprising: a first member having a first surface for contacting a surface of a material to be marked or scribed during a marking or scribing operation, a second surface disposed opposite the first surface, and a longitudinal slot extending from the first surface to the second surface; a second member slidably and pivotally coupled directly to the second surface of the first member, the second member having a first main surface, a second main surface disposed opposite the first main surface, and a through-hole extending from the first main surface to the second main surface, the through-hole being generally vertically aligned with the longitudinal slot of the first member at preselected positions of the second member relative to the first member for receiving therethrough a marking member or a scribing tool so that during a marking or scribing operation, the multi-purpose hand tool can be used to mark or scribe a line on the surface of the material when the marking member or the scribing tool is inserted generally vertically through the through-hole of the second member and the longitudinal slot of the first member in any of the preselected positions and is maintained in contact with the surface of the material while the first member and the second member are displaced relative to the material; and holding means disposed in the through-hole of the second member for holding the marking member or scribing tool generally vertically through the through-hole of the second member and the longitudinal slot of the first member during a marking or scribing operation.

31. A multi-purpose hand tool according to claim 30; wherein the holding means comprises a tubular insert disposed in the through-hole of the second member, and gripping means extending from an inner peripheral surface of the tubular insert for gripping the marking member.

32. A multi-purpose hand tool according to claim 30; wherein the second member has a first end portion, a second end portion having the through-hole, and means defining at least one marking member rest disposed at the first end portion for providing a resting surface on which a marking member is rested for marking a line on the surface of the material during a marking operation.

33. A multi-purpose hand tool according to claim 32; wherein the means defining a marking member rest comprises at least one notch portion cut in the second member at the first end portion thereof.

34. A multi-purpose hand tool according to claim 33; wherein the first end portion of the second member comprises a pair of converging tapered surfaces connected at one end thereof; and wherein the at least one notch portion comprises a pair of notch portions cut in respective tapered surfaces of the second member.

35. In combination: a multi-purpose hand tool according to claim 30; and a cutting tool having a cutting member for insertion generally vertically through the through-hole of the second member and the longitudinal slot of the first member in any of the preselected positions for cutting a line in the surface of the material when the first member and the second member are displaced relative to the material while the cutting member is maintained in contact with the surface of the material.

36. A multi-purpose hand tool comprising:
   a first member having first and second opposite ends, a first portion having the first end, a second portion having the second end, first and second opposite main surfaces, and an elongated slot formed in the second portion and extending through the first and second opposite main surfaces thereof;
   a second member having first and second opposite main surfaces, first and second opposite end portions, a through-hole formed in the second end portion and extending through the first and second opposite main surfaces of the second member, and means defining at least one marking member rest formed in the first end portion for providing a resting surface on which a marking member is rested for marking a surface of a material during a first marking operation; and
   coupling means for slidably and rotatably coupling the second member to the second portion of the first member so that the through-hole is generally vertically aligned with the elongated slot of the first member at preselected positions of the second member relative to the first member for receiving therethrough a marking member for marking the surface of a material during a second marking operation different from the first marking operation and during a third marking operation different from the first and second marking operations, the coupling means including releasable locking means having an unlocked position for permitting the second member to linearly slide on the second portion of the first member for the first marking operation until the first end portion of the second member overhangs from the second end of the first member and for permitting the second member to rotate and linearly slide on the second portion of the first member to any of the preselected positions for the second and third marking operations, and a locked position for securing the second member to the second portion of the first member to prevent relative movement therebetween during the first, second and third marking operations.

37. A multi-purpose hand tool according to claim 36; wherein the first marking operation comprises an operation for marking a material for a door or window frame for the installation of a door or window casing, the second marking operation comprises an operation for marking an arc or a circle on the surface of the material, and the third marking operation comprises an operation for marking a line on a piece of the material which needs to be fitted against an uneven surface.

38. A multi-purpose hand tool comprising:

a first member having a first portion and a second portion;

a second member slidably and pivotally coupled to the second portion of the first member;

a coupling assembly for slidably and pivotally coupling the second member to the second portion of the first member and allowing the second member to slide on and pivot relative to the second portion between a first position proximate a first end of the second portion in which the multi-purpose hand tool can be used to obtain a measurement for a first marking or scribing operation, and a second position proximate a second end of the second portion opposite the first end thereof in which the multi-purpose hand tool can be used to obtain a measurement for a second marking or scribing operation different from the first marking or scribing operation, thereby providing a multi-purpose hand tool reconfigurable for a plurality of purposes; and a retractable needle assembly mounted on the first portion of the first member for positioning the multi-purpose hand tool on the surface of the material during at least one of the first and second marking or scribing operations, the retractable needle assembly comprising a finger-engagement portion for undergoing rotation in first and second opposite directions over a first surface of the first portion and a pin for undergoing rotation with the finger-engagement portion, the pin having a head portion, a stem extending from the head portion and having a needle point, and a male threaded joint disposed on the stem and between the head portion and the needle point, the first portion of the first member having a through-hole extending from the first surface of the first portion to a second surface thereof opposite the first surface, the through-hole having a female threaded joint for engagement with the male threaded joint of the pin so that upon rotation of the finger-engagement portion in the first direction, the pin is displaced in a direction along a longitudinal axis thereof to protrude the needle point of the stem from an end of the through-hole at the second surface of the first portion, and so that upon rotation of the finger-engagement portion in the second direction, the pin is displaced along the longitudinal axis to retract the needle point into the through-hole, and the finger-engagement portion having a cavity for receiving the head portion of the stem so that rotation of the finger-engagement portion in each the first and second directions rotates the pin in the respective first and second direction and allows movement of the head portion of the pin within the cavity along the longitudinal axis.

39. A multi-purpose hand tool comprising:

a first member having a first portion and a second portion;

a second member slidably and pivotally coupled to the second portion of the first member, the second member having a top main surface, a bottom main surface, a first end, a second end, and a through-hole disposed at the second end and extending through the top and bottom main surfaces;

a tubular insert disposed in the through-hole of the second member for receiving a marking pencil for marking a surface of a material during a marking operation, the tubular insert having a plurality of ribs extending from an inner peripheral surface of the tubular insert for gripping the marking pencil;

a notch portion cut in the second member at the first end thereof and defining a marking pencil rest providing a resting surface on which a marking pencil is rested for marking a surface of a material during a marking operation; and a coupling assembly for slidably and pivotally coupling the second member to the second portion of the first member and allowing the second member to slide on and pivot relative to the second portion between a first position proximate a first end of the second portion in which the multi-purpose hand tool can be used to obtain a measurement for a first marking operation, and a second position proximate a second end of the second portion opposite the first end thereof in which the multi-purpose hand tool can be used to obtain a measurement for a second marking operation different from the first marking operation, thereby providing a multi-purpose hand tool reconfigurable for a plurality of purposes.

* * * * *